US010823145B2

(12) United States Patent
Zhou et al.

(10) Patent No.: US 10,823,145 B2
(45) Date of Patent: Nov. 3, 2020

(54) WIND TURBINE VARIABLE-PITCH CONTROL METHOD AND DEVICE

(71) Applicant: BEIJING GOLDWIND SCIENCE & CREATION WINDPOWER EQUIPMENT CO., LTD., Beijing (CN)

(72) Inventors: Jie Zhou, Beijing (CN); Hao Tang, Beijing (CN); Qingtian Wang, Beijing (CN)

(73) Assignee: Beijing Goldwind Science & Creation Windpower Equipment Co., LTD., Beijing (CN)

( * ) Notice: Subject to any disclaimer, the term of this patent is extended or adjusted under 35 U.S.C. 154(b) by 161 days.

(21) Appl. No.: 15/773,060

(22) PCT Filed: May 18, 2017

(86) PCT No.: PCT/CN2017/084910
§ 371 (c)(1),
(2) Date: May 2, 2018

(87) PCT Pub. No.: WO2018/024018
PCT Pub. Date: Feb. 8, 2018

(65) Prior Publication Data
US 2018/0320664 A1 Nov. 8, 2018

(30) Foreign Application Priority Data

Aug. 2, 2016 (CN) .......................... 2016 1 0625804

(51) Int. Cl.
F03D 7/04 (2006.01)
F03D 7/02 (2006.01)

(52) U.S. Cl.
CPC .......... *F03D 7/042* (2013.01); *F03D 7/0224* (2013.01); *F03D 7/0292* (2013.01);
(Continued)

(58) Field of Classification Search
None
See application file for complete search history.

(56) References Cited

U.S. PATENT DOCUMENTS 4,656,362 A 4/1987 Harner et al.
7,351,033 B2 4/2008 McNerney
(Continued)

FOREIGN PATENT DOCUMENTS

CN 101235794 A 8/2008
CN 101400892 A 4/2009
(Continued)

OTHER PUBLICATIONS

First Office Action issued in counterpart Chinese Patent Application No. 201610625804.X, dated Aug. 3, 2018.
(Continued)

*Primary Examiner* — Brian P Wolcott
*Assistant Examiner* — Jason G Davis
(74) *Attorney, Agent, or Firm* — Finnegan, Henderson, Farabow, Garrett & Dunner LLP

(57) ABSTRACT

A method and a device for use in variable-pitch control of a wind turbine, in said method: if a current wind speed is continuously maintained at a small wind speed, then periodically detecting whether a maintained duration of a current pitch angle of a wind turbine reaches a preset duration; once the preset duration is reached, switching a current minimum pitch angle to another minimum pitch angle.

15 Claims, 6 Drawing Sheets

(52) U.S. Cl.
CPC ... *F05B 2260/74* (2013.01); *F05B 2270/1095* (2013.01); *F05B 2270/32* (2013.01); *F05B 2270/327* (2013.01); *F05B 2270/328* (2013.01); *Y02E 10/723* (2013.01)

(56) References Cited

U.S. PATENT DOCUMENTS

| | | | |
|---|---|---|---|
| 7,569,945 | B2 | 8/2009 | Pedersen |
| 8,174,136 | B2 * | 5/2012 | Johnson ................ F03D 7/0224 290/44 |
| 8,803,351 | B2 * | 8/2014 | Dalsgaard ............. F03D 7/0224 290/44 |
| 8,816,871 | B2 | 8/2014 | Drossel et al. |
| 9,835,137 | B2 | 12/2017 | Atzler et al. |
| 2007/0057517 | A1 | 3/2007 | McNerney |
| 2009/0021015 | A1 | 1/2009 | Pedersen |
| 2010/0140941 | A1 * | 6/2010 | Egedal .................. F03D 7/0224 290/44 |
| 2012/0091713 | A1 | 4/2012 | Egedal et al. |
| 2012/0139740 | A1 | 6/2012 | Drossel et al. |
| 2013/0144449 | A1 * | 6/2013 | Dalsgaard ............... F03D 7/048 700/287 |
| 2015/0132129 | A1 | 5/2015 | Atzler et al. |
| 2015/0176569 | A1 | 6/2015 | Karikomi et al. |
| 2016/0377057 | A1 | 12/2016 | Caponetti et al. |

FOREIGN PATENT DOCUMENTS

| | | |
|---|---|---|
| CN | 101672254 A | 3/2010 |
| CN | 102486158 A | 6/2012 |
| CN | 104428531 A | 3/2015 |
| CN | 104632524 A | 5/2015 |
| CN | 105351144 A | 2/2016 |
| CN | 105649875 A | 6/2016 |
| EP | 2444659 A1 | 4/2012 |
| EP | 2848805 A1 | 3/2015 |
| EP | 2886853 A1 | 6/2015 |
| KR | 101551219 B1 | 9/2015 |
| WO | WO 2015/086023 A1 | 6/2015 |

OTHER PUBLICATIONS

First Office Action issued in counterpart Australian Patent Application No. 2017307103 dated Apr. 5, 2019.
International Search Report issued in International Application No. PCT/CN2017/084910, mailed from the State Intellectual Property Office of China dated Aug. 18, 2017.
Extended European Search Report issued by European Patent Office for European Application No. 17836202.6, dated Aug. 5, 2019.

* cited by examiner

WIND TURBINE VARIABLE-PITCH CONTROL METHOD AND DEVICE

The present application is the national phase of International Application No. PCT/CN2017/084910, titled "WIND TURBINE VARIABLE-PITCH CONTROL METHOD AND DEVICE", and filed on May 18, 2017, which claims priority to Chinese Patent Application No. 201610625804.X, titled "PITCH CONTROL METHOD AND DEVICE FOR WIND TURBINE", filed on Aug. 2, 2016 with the State Intellectual Property Office of the People's Republic of China, which are incorporated herein by reference in its their entireties.

FIELD

The present disclosure relates to the technical field of wind power generation, and in particular to a pitch control method and device for a wind turbine.

BACKGROUND

In a wind turbine (abbreviated as "WT"), wind energy is converted into electric energy by blades to generate power. A pitch angle is a wind alignment angle of the blade of the wind turbine, which is an important parameter for operation of the wind turbine.

Generally, in a case that a wind condition is in an undesirable state, i.e., less than a rated wind speed, the pitch angle of the wind turbine is maintained at a minimum pitch angle for a long time. In this case, a pitch drive mechanism (such as a cog belt, a pitch bearing and a cylinder of hydraulic pitch control) of the wind turbine maintains in one state for a long term, and a point of the pitch drive mechanism bears varying wind load and gravity load for a long time, hence, a position of the point becomes a fatigue and weak point of the whole pitch drive mechanism.

A failure at the fatigue and weak point will result in an overall failure of the pitch drive mechanism, thus shortening service life of the pitch drive mechanism. Particularly, in some wind farms with undesirable wind resources, the service life of the pitch drive mechanism is consumed seriously since the wind turbine operates at the rated wind speed for a long term.

SUMMARY

Technical solutions according to the present disclosure are as follows.

A pitch control method for a wind turbine is provided according to a first aspect of the present disclosure. The pitch control method includes:

setting multiple minimum pitch angles; and switching periodically among the multiple minimum pitch angles according to a first preset duration.

A pitch control device for a wind turbine is provided according to a second aspect of the present disclosure. The pitch control device includes:

a minimum pitch angle setting module, configured to set multiple minimum pitch angles; and a minimum pitch angle switching module, configured to switch periodically among the multiple minimum pitch angles according to a first preset duration.

A pitch control device for a wind turbine is provided according to a third aspect of the present disclosure. The pitch control device includes:

a memory, configured to store instructions for performing any one of the above methods; and a processor, configured to read and execute the instructions in the memory.

BRIEF DESCRIPTION OF THE DRAWINGS

In order to illustrate technical solutions in embodiments of the present disclosure more clearly, drawings used in the description of the embodiments are introduced briefly hereinafter. Apparently, the drawings described hereinafter merely illustrate some embodiments of the present disclosure, and other drawings may be obtained by those skilled in the art based on these drawings without any creative efforts.

DETAILED DESCRIPTION OF EMBODIMENTS

Figure 1:
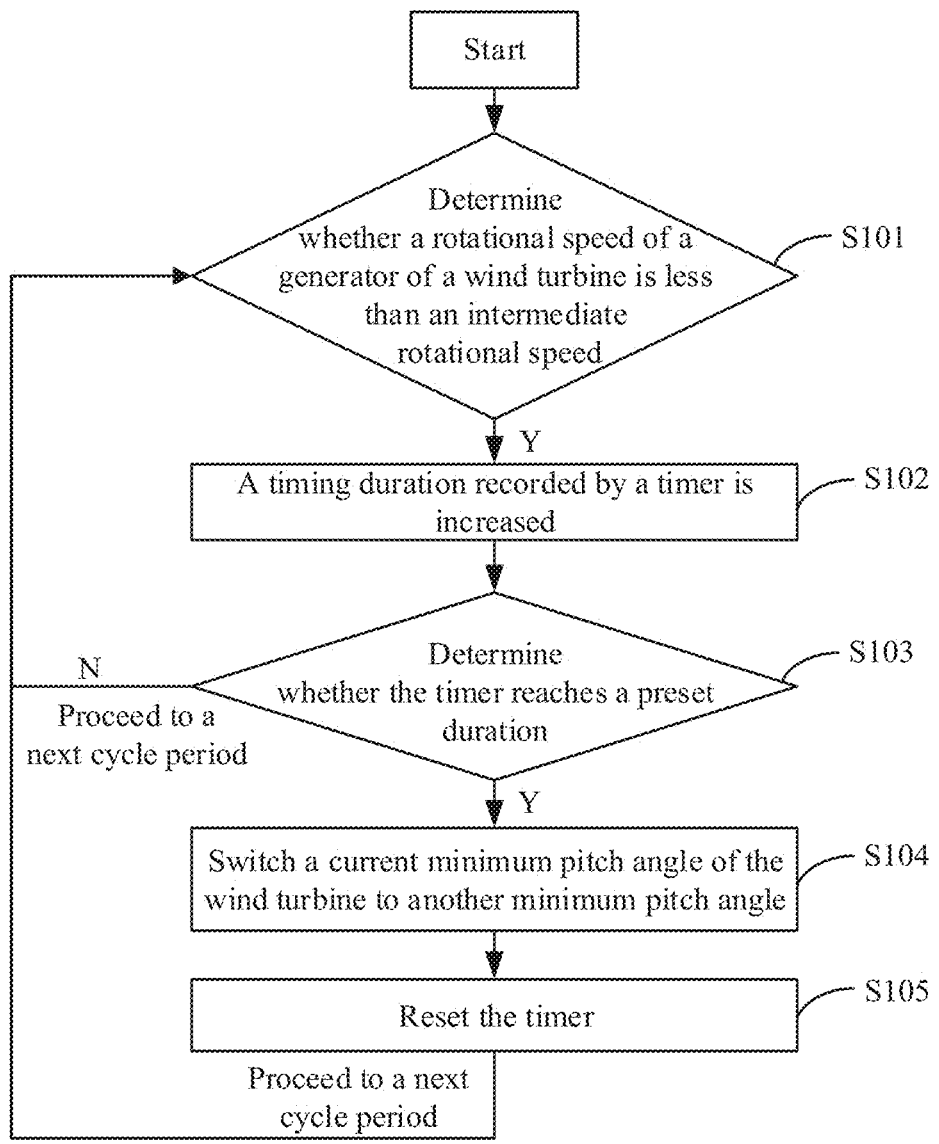
FIG. 1 is a flow chart of a pitch control method for a wind turbine according to a first embodiment of the present disclosure.

Technical solutions in embodiments of the present disclosure are described clearly and completely hereinafter in conjunction with the drawings of the embodiments of the present disclosure. Apparently, the embodiments described herein are only a few rather than all of the embodiments of the invention. All other embodiments obtained based on the embodiments of the present disclosure by those skilled in the art without any creative efforts fall within the protection scope of the present disclosure.

A wind turbine (abbreviated as "WT") includes a pitch drive mechanism for changing and maintaining a pitch angle. At present, in a case that a wind speed is less than a rated wind speed, the pitch drive mechanism maintains the pitch angle at a fixed angle value for a long time, which is referred to as a minimum pitch angle (or a default minimum pitch angle). In this case, although maximum wind energy is captured, a point position of the pitch drive mechanism may become a fatigue and weak point since it bears wind load and gravity load for a long time.

In embodiments of the present disclosure, multiple minimum pitch angles (may be two or more) are set, and switching is periodically performed among the multiple minimum pitch angles, to distribute fatigue of a single weak point to a strip region, thereby extending service life of the pitch drive mechanism.

In the periodical switching among the minimum pitch angles, a preset duration may be determined as a precondition. That is, before a switching, it is determined whether a maintaining duration of a current minimum pitch angle reaches the preset duration. If the maintaining duration reaches the preset duration, the current minimum pitch angle is switched to another minimum pitch angle of the multiple minimum pitch angles. Otherwise, the current minimum pitch angle is maintained. In the determining, maintaining durations of the minimum pitch angles may be a same preset duration or may be different preset durations, and reference can be made to the embodiments for detailed description. The above method is a simplest way to distributing the fatigue of a single weak point of the pitch drive mechanism, in which a generation power of the wind turbine and other related factors are not considered.

The multiple minimum pitch angles may be set in multiple manners. For example, an angle by which a pitch angle is to be changed may be set for each switching. For example, the pitch angle is increased by 0.5 degree in each switching. As another example, multiple fixed minimum pitch angle values may be set, such as four values: 3.5 deg (degree), 4 deg, 4.5 deg and 5 deg. The above descriptions are merely examples, and the multiple minimum pitch angles may be set in other manners that can be anticipated by those skilled in the art. The preset duration herein may be referred to as a first preset duration, to differentiate it from a preset duration for periodically acquiring a preset parameter and a preset duration used in a delay link hereinafter.

Several preferred embodiments are provided based on the above simple manners, to better achieve the periodical switching among the multiple minimum pitch angles according to the preset duration.

Reference is made to FIG. 1, which shows a flow chart of a pitch control method for a wind turbine according to a first embodiment.

The process is performed periodically and cyclically (as indicated by a line returning to step S101 in the figure), and steps S101 to S105 are performed in each cycle period.

In step S101, it is determined whether a rotational speed of a generator in the wind turbine is less than an intermediate rotational speed. Step S102 is performed if the rotational speed of the generator is less than the intermediate rotational speed.

Before the implementation, the intermediate rotational speed is preset. The intermediate rotational speed may be an average value of a maximum rotational speed and a minimum rotational speed of the generator in the wind turbine, and the maximum rotational speed and the minimum rotational speed are factory parameter values of the generator. The current rotational speed of the generator in the wind turbine is detected and compared with the intermediate rotational speed. If the current rotational speed is less than the intermediate rotational speed, it is indicated that a current wind speed is in a small wind speed state, and step S102 is performed.

In step S102, a timing duration recorded by a timer is increased.

The timer is increased by a preset timing duration. The timing duration may be equal to the cycle period. For example, the timer is increased by 20 milliseconds in a case that the cycle period is 20 milliseconds. The timing duration of the timer may be set as needed. The timing duration recorded by the timer may be used for representing a maintaining duration of a current minimum pitch angle.

In step S103, it is determined whether the timer reaches a preset duration. If the timer reaches the preset duration, step S104 is performed. If the timer does not reach the preset duration, the process proceeds to a next cycle period to perform the determination in step S101.

The preset duration herein is may be referred to as a first preset duration to differentiate it from a preset duration described below.

In an example, the preset duration may be set as a fixed duration. A maintaining duration of each current minimum pitch angle recorded by the timer is compared with the preset duration. For example, if the preset duration is set as 0.5 hour, the duration recorded by the timer is compared with 0.5 hour each time. If the timer does not reach the preset duration, the current minimum pitch angle is maintained. Otherwise, a switching action in step S104 is performed.

In the example, the maintaining durations of the minimum pitch angles are the same, and implementation of the solution is simple.

In another example, different preset durations may be set for different minimum pitch angles, and a correspondence may be built between the preset durations and the minimum pitch angles. In this case, the determination in step S103 includes: determining a current minimum pitch angle, determining a preset duration corresponding to the current minimum pitch angle based on the correspondence between the minimum pitch angles and the preset durations, and comparing the timing duration recorded by the timer with the determined preset duration.

For example, two minimum pitch angles ($\theta 1$ and $\theta 2$) are preset, a maintaining duration of $\theta 1$ is set as 0.4 hour, and a maintaining duration for $\theta 2$ is set as 0.6 hour. In this case, in performing the step, a current minimum pitch angle is first determined. If the current minimum pitch angle is $\theta 1$, then 0.4 hour is determined as the preset duration corresponding to $\theta 1$, and the timing duration recorded by the timer is compared with 0.4 hour.

In the example, the maintaining durations of the different pitch angles are different. Compared with the above examples, this example has a little more complex implementation and a better fatigue distribution effect. A pitch execution system may have different fatigue degrees at different minimum pitch angles. Therefore, the different maintaining durations may be set for the different minimum pitch angles based on empirical data of the fatigue degrees and the minimum pitch angles. A short maintaining duration is set for a minimum pitch angle having a great effect on fatigue degree, thereby achieving a better fatigue sharing effect.

Two manners are provided in the above. In a specific application, the control manner may be selected as needed.

In step S104, the current minimum pitch angle of the wind turbine is switched to another minimum pitch angle.

In an implementation, the multiple minimum pitch angles may be preset. If the timer reaches the preset duration, a minimum pitch angle other than the current minimum pitch angle is selected from the multiple minimum pitch angles, the current minimum pitch is switched to the selected minimum pitch angle, and then step S105 is performed.

The minimum pitch angle may be selected in multiple manners.

In one selecting manner, the minimum pitch angle may be randomly selected from the multiple minimum pitch angles, as long as the selected minimum pitch angle is different from the current pitch angle. This manner is simple. However, the numbers of times that the multiple minimum pitch angles are selected may be seriously nonuniform, and switching is performed among several of the minimum pitch angles, which can not achieve an optimal fatigue sharing effect.

In another selecting manner, the multiple minimum pitch angles are sorted based on their magnitudes, and switching is performed among the multiple minimum pitch angles in a sequence from large to small or in a sequence from small to large.

For example, four angles are selected from a range of [3.5, 5] deg (degree) as minimum pitch angles. It is assumed that the four minimum pitch angles are respectively 3.5 deg, 4 deg, 4.5 deg and 5 deg, then the minimum pitch angles are selected in a sequence from large to small or in a sequence from small to large. For instance, if the current minimum pitch angle is 3.5 deg, then 4 deg is selected as the minimum pitch angle reached after the switching.

In a case that a boundary minimum pitch angle is selected as the current minimum pitch angle based on a certain sequence, a previous minimum pitch angle may be selected next based on a reverse order, for example, 3.5->5->3.5->5 . . . . Practically, selection may also be performed based on the original order, for example, 3.5->5, 3.5->5, . . . .

In addition to the manner of selecting the minimum pitch angle from the multiple minimum pitch angles, an angle change amount, such as 0.5 deg, to be added (or subtracted) at each switching is set, instead of presetting the minimum pitch angles. In this case, the current minimum pitch angle is increased (or decreased) by the angle change amount, to obtain a minimum pitch angle reached after the switching. When the obtained minimum pitch angle reaches a boundary angle, the minimum pitch angle is then gradually decreased (or increased) by the angle change amount.

For example, an angle amount to be added at each time is preset as 0.5 deg, and boundary angles are 3.5 deg and 5 deg. It is assumed that the current minimum pitch angle is 4.5 deg, then 5 deg is determined as the minimum pitch angle reached after the switching. In this case, the boundary angle is reached, then the minimum pitch angle may be gradually decreased by 0.5 deg at the next time until it reaches 3.5 deg. After that, the minimum pitch angle is repeatedly increased by 0.5 deg. In this way, the minimum pitch angle is gradually switched.

In step S105, the timer is reset. A next cycle period is started, and step S101 is repeated.

The timer is reset to recount a maintaining duration of the minimum pitch angle reached after the switching. In addition, the cycle period is preset, for example, to be a duration of 20 ms, and each time the duration has passed, a next cycle period is started and step S101 is repeated. The cycle period herein may be defined as a second preset duration.

In conclusion, the above cyclic performing of steps S101 to S105 is to achieve the following effects. In a case that the current wind speed maintains at the small wind speed state, it is periodically detected whether the maintaining duration of the current pitch angle of the wind turbine reaches the preset duration, and the current minimum pitch angle is switched to another minimum pitch angle each time the preset duration is reached. In the solution, by setting the operating parameter determination step, it is ensured that the minimum pitch angle is no longer switched after a current operation state of the wind turbine reaches or exceeds a preset condition. In this way, an overlarge power loss of the wind turbine, caused by changing the minimum pitch angle at a non-small wind speed state, is avoided. In a range allowed by the preset condition (at the small wind speed state), the pitch drive mechanism may continuously switch the minimum pitch angle. In this way, fatigue of a single weak point may be distributed to a strip region, thereby extending service life of the pitch drive mechanism. Further, deformation and stagnation of pitch bearing ball are prevented, oil condensation of pitch bearing is avoided, and so on.

In the above embodiments, determining whether the rotational speed of the generator in the wind turbine is less than the intermediate rotational speed in step S101 is to determine whether the current wind speed is at the small wind speed state.

Practically, in a specific application, whether the current wind speed is at the small wind speed state may be determined in other manners. For example, a wind speed may be directly measured and compared with a preset small wind speed. As another example, the determining may be performed based on an operating parameter of the wind turbine, such as a wind speed, a power or a turbulence intensity, where the parameter may directly or indirectly reflect wind speed situation. Or, the determining may be performed in other manners that can be anticipated by those skilled in the art.

Figure 2:
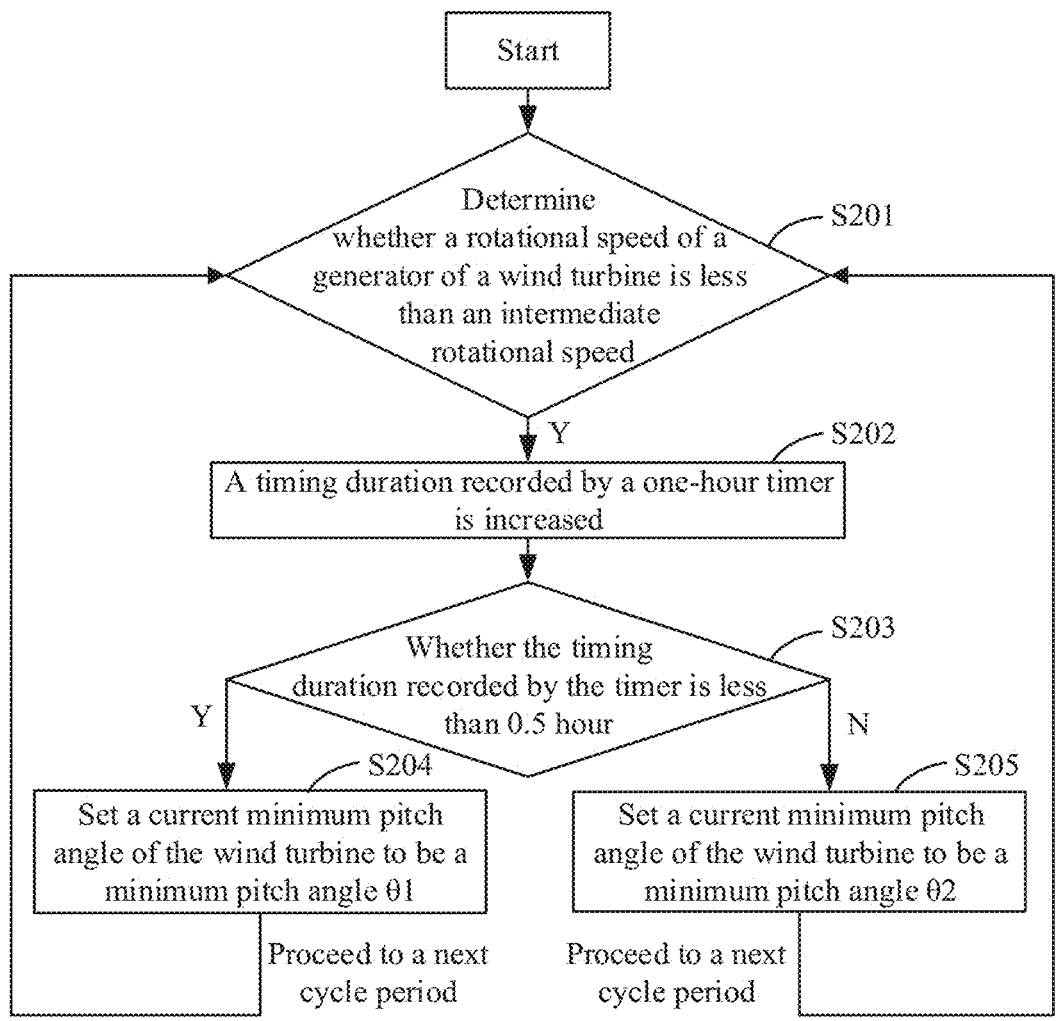
FIG. 2 is a flow chart of a pitch control method for a wind turbine according to a second embodiment of the present disclosure.

Reference is made to FIG. 2, which shows a flow chart of a pitch control method for a wind turbine according to a second embodiment of the present disclosure. In the embodiment, a timer with an auto-reset function is adopted. Specifically, a one-hour timer is used (the timer automatically resets when the timer reaches one hour). Two minimum pitch angles ($\theta 1$ and $\theta 2$) are preset, and each of the minimum pitch angles is maintained for 0.5 hour.

In the embodiment, the process are performed cyclically, and steps S201 to S205 are performed in each cycle.

In step S201, it is determined whether a rotational speed of a generator in the wind turbine is less than an intermediate rotational speed. If the rotational speed is less than the intermediate rotational speed, step S202 is performed.

Reference can be made to the description of step S101 in the first embodiment for descriptions related to this step, which is not described herein.

In step S202, a timing duration recorded by the one-hour timer is increased.

A timing duration by which the timer is increased is a preset duration, which may be the same as a cycle period.

In step S203, it is determined whether the timing duration recorded by the timer is less than 0.5 hour. If the timing duration recorded is less than 0.5 hour, step S204 is performed. Otherwise, step S205 is performed.

In step S204, a current minimum pitch angle is set as the minimum pitch angle $\theta 1$.

Practically, if the timing duration recorded by the timer is less than 0.5 hour and the current minimum pitch angle is $\theta 1$ in the current cycle, a pitch drive mechanism will not perform a pitch action. In a case that the timing duration recorded by the timer is greater than or equal to 0.5 hour in a subsequent cycle, the current minimum pitch angle is regulated from $\theta 1$ to $\theta 2$.

In step S205, a current minimum pitch angle is switched to the minimum pitch angle $\theta 2$.

Similarly, if the timing duration recorded by the timer is greater than or equal to 0.5 hour and the current minimum pitch angle is $\theta 2$ in the current cycle, the pitch drive mechanism will not perform a pitch action. In a case that the timing duration recorded by the timer is reset and then is less than 0.5 hour in a subsequent cycle, the current minimum pitch angle is regulated from $\theta 2$ to $\theta 1$.

According to the above embodiments, the minimum pitch angle is switched between two different pitch angles in a case of a small wind speed state, thereby alleviating fatigue of a single point of the pitch drive mechanism and extending service life of the pitch drive mechanism.

In a practical application, the above embodiments have alternative solutions.

For example, the timer is not limited to the one-hour timer, and may be any other timer having an auto-reset function for an arbitrarily duration. In addition, in a case that the timer is the one-hour timer, the maintaining durations of θ1 and θ2 are not limited to 0.5 hour, and may be different durations. For example, the maintaining duration of θ1 is 0.4 hour while the maintaining duration of θ2 is 0.6 hour.

Furthermore, the number of the minimum pitch angles is not limited to two, and may be any other value that can be anticipated by those skilled in the art. In a case that the number of the minimum pitch angles is more than one, reference can be made to related description in the first embodiment for the maintaining duration and switching manner of each of the minimum pitch angles, which is not described herein.

Figure 3:
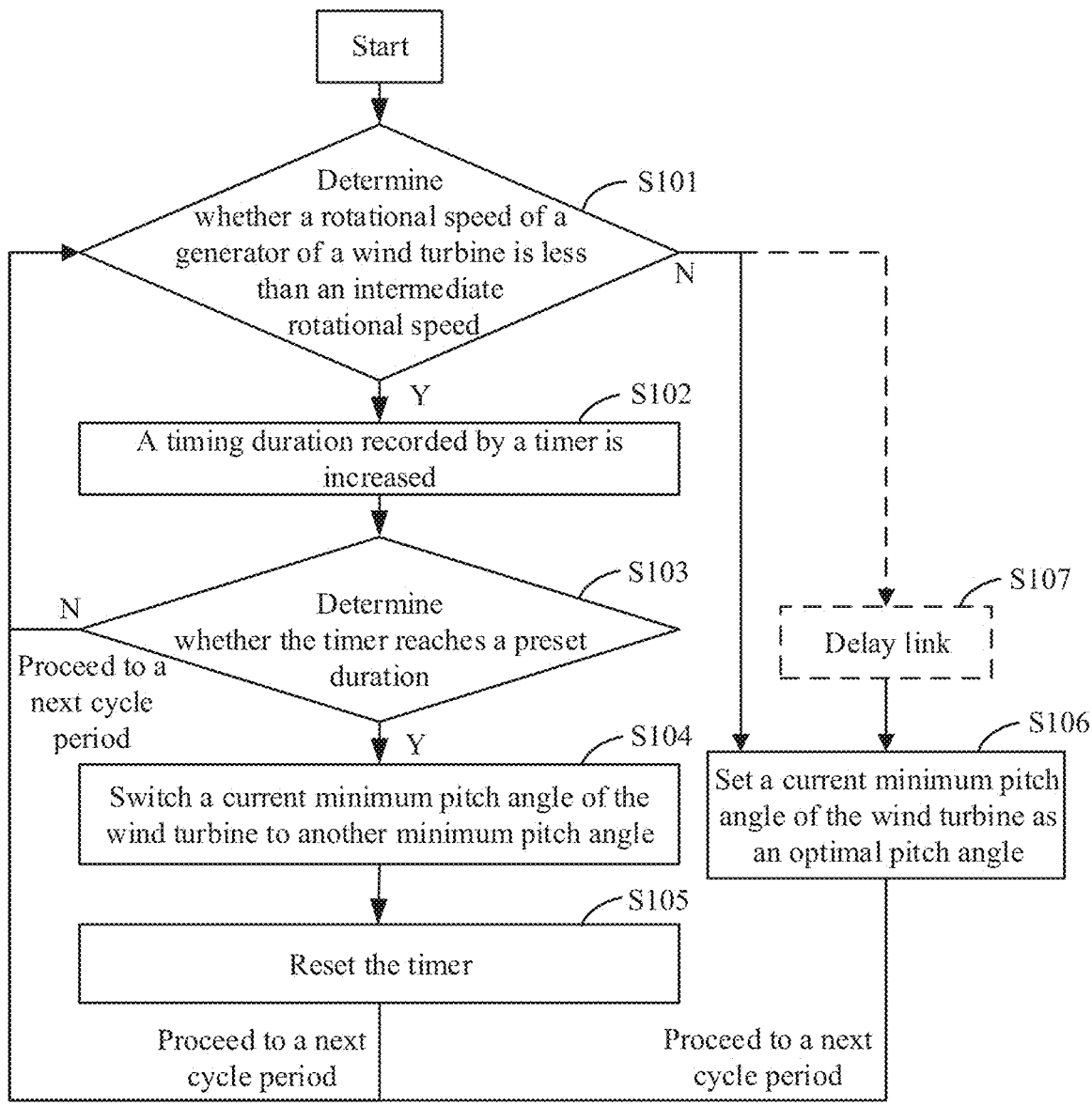
FIG. 3 is a flow chart of a pitch control method for a wind turbine according to a third embodiment of the present disclosure.

Reference is made to FIG. 3, which shows a flow chart of a control method for a pitch drive mechanism of a wind turbine according to a third embodiment.

The method according to the embodiment further includes step S106 with respect to the first embodiment. Hereinafter, only step S106 is described, and reference can be made to the first embodiment for description of other steps, which is not described herein.

In step S101, it is determined whether a rotational speed of a generator in the wind turbine is less than an intermediate rotational speed. Step S102 is performed if the rotational speed of the generator is less than the intermediate rotational speed, and step S106 is performed if the rotational speed of the generator is not less than the intermediate rotational speed.

If the rotational speed of the generator in the wind turbine is greater than or equal to the intermediate rotational speed, it is indicated that a current wind speed changes to a large wind speed state. The step may be replaced by a step of determining whether the current wind speed is less than a preset small wind speed. If the current wind speed is not less than the preset small wind speed, it also indicates that the current wind speed changes to the large wind speed state.

If the wind speed changes to the large wind speed state, a minimum pitch angle switching action in step S106 is performed.

In step S102, a timing duration recorded by a timer is increased.

In step S103, it is determined whether the timer reaches a preset duration. If the timer reaches the preset duration, step S104 is performed. Otherwise, the process proceeds to a next cycle period to perform step S101.

In step S104, a current minimum pitch angle of the wind turbine is switched to another minimum pitch angle.

In step S105, the timer is reset. A next cycle period is started, and the determination step in step S101 is repeated.

In step S106, a current minimum pitch angle of the wind turbine is set as a default minimum pitch angle.

If it is determined in step S101 that the current rotational speed of the generator in the wind turbine is greater than or equal to the intermediate rotational speed, it is indicated that the current wind speed is the large wind speed state. In this case, the current minimum pitch angle of the wind turbine may be directly switched to the default minimum pitch angle.

Generally, the default minimum pitch angle is 0 deg, and practically, may be other values. In a case of the large wind speed state, maximum wind energy can be captured by switching the minimum pitch angle to the default minimum pitch angle, thereby achieving a better power generation effect.

In conclusion, according to the embodiment, the minimum pitch angle is switched in a case of the small wind speed state to share fatigue of a single point of the pitch drive mechanism, and the minimum pitch angle is regulated to the default minimum pitch angle in a case of the large wind speed state to capture the maximum wind energy. Based on the embodiment, requirements of both fatigue sharing and wind energy capture are taken into account, which has a wider application.

It should be noted that, the steps in the above embodiment are performed cyclically. Thus, performing of step S106 includes two situations, i.e., a situation where the determination result of step S101 is negative for the first time, and a situation where the determination result of step S101 is negative for a time other than the first time.

In the situation where the determination result is negative for the first time, it is indicated that the wind speed changes from the small wind speed state to the large wind speed state. In this case, the minimum pitch angle of the wind turbine is not the default minimum pitch angle, and the pitch drive mechanism performs a pitch operation, to switch the minimum pitch angle to the default minimum pitch angle.

In the situation where the determination result is negative for a time other than the first time, it is indicated that the wind speed has entered into the large wind speed state and has been maintained at the state. In this case, the minimum pitch angle of the wind turbine has been switched to the default minimum pitch angle, and the pitch drive mechanism may not perform a pitch operation, thereby maintaining the minimum pitch angle at the default minimum pitch angle.

Similarly, the positive determination result of step S101 also includes two situations, i.e., a situation where the determination result is positive for the first time, and a situation where the determination result is positive for a time other than the first time.

In the situation where the determination result is positive for the first time, it is indicated that the wind speed changes from the large wind speed state to the small wind speed state. In this case, the minimum pitch angle of the wind turbine needs to be switched from the default minimum pitch angle to a certain minimum pitch angle. The certain minimum pitch angle is set for the small wind speed state, such as a certain one of the multiple minimum pitch angles preset in step S104. In addition, the timer is reset, and step S102 and subsequent steps are performed.

In the situation where the determination result is positive for a time other than the first time, it is indicated that the wind speed maintains at the small wind speed state. In this case, the process in the first embodiment may be performed, to switch the minimum pitch angle in a case that the wind speed is maintained at the small wind speed state.

As can be seen, in a case that the wind speed is not steady and fluctuates around a small wind speed, the minimum pitch angle is switched once the determination result of step S101 is negative. In this case, the minimum pitch angle is frequently switched during a short time, thus causing loss of power generation.

In order to solve the above problem, as shown in FIG. 3, a delay link of step S107 may be set before step S106.

The delay link is entered in a case that the current rotational speed of the generator in the wind turbine is determined to be greater than or equal to the intermediate rotational speed in step S101.

In the delay link, instead of changing the current minimum pitch angle of the wind turbine, a timing is started for the large wind speed state and the process returns to step S101. If the determination result of step S101 is still negative, it is indicated that the wind speed is maintained at the large wind speed state, and it is further determined whether a maintaining duration reaches a preset duration (the preset duration herein may be referred to as a third preset duration). If the maintaining duration reaches the preset duration, step S107 is performed. Otherwise, the process returns to step S101.

As can be seen, with the delay link, the minimum pitch angle is prevented from being frequently switched, thereby avoiding the loss of power generation and achieving a better power generation effect.

In order to ensure that the wind turbine operates at a maximum power coefficient point, after the minimum pitch angle is switched, an optimal gain corresponding to the minimum pitch angle reached after the switching is determined. The optimal gain is used for a torque control of the wind turbine to achieve an optimal wind energy capture.

Figure 4:
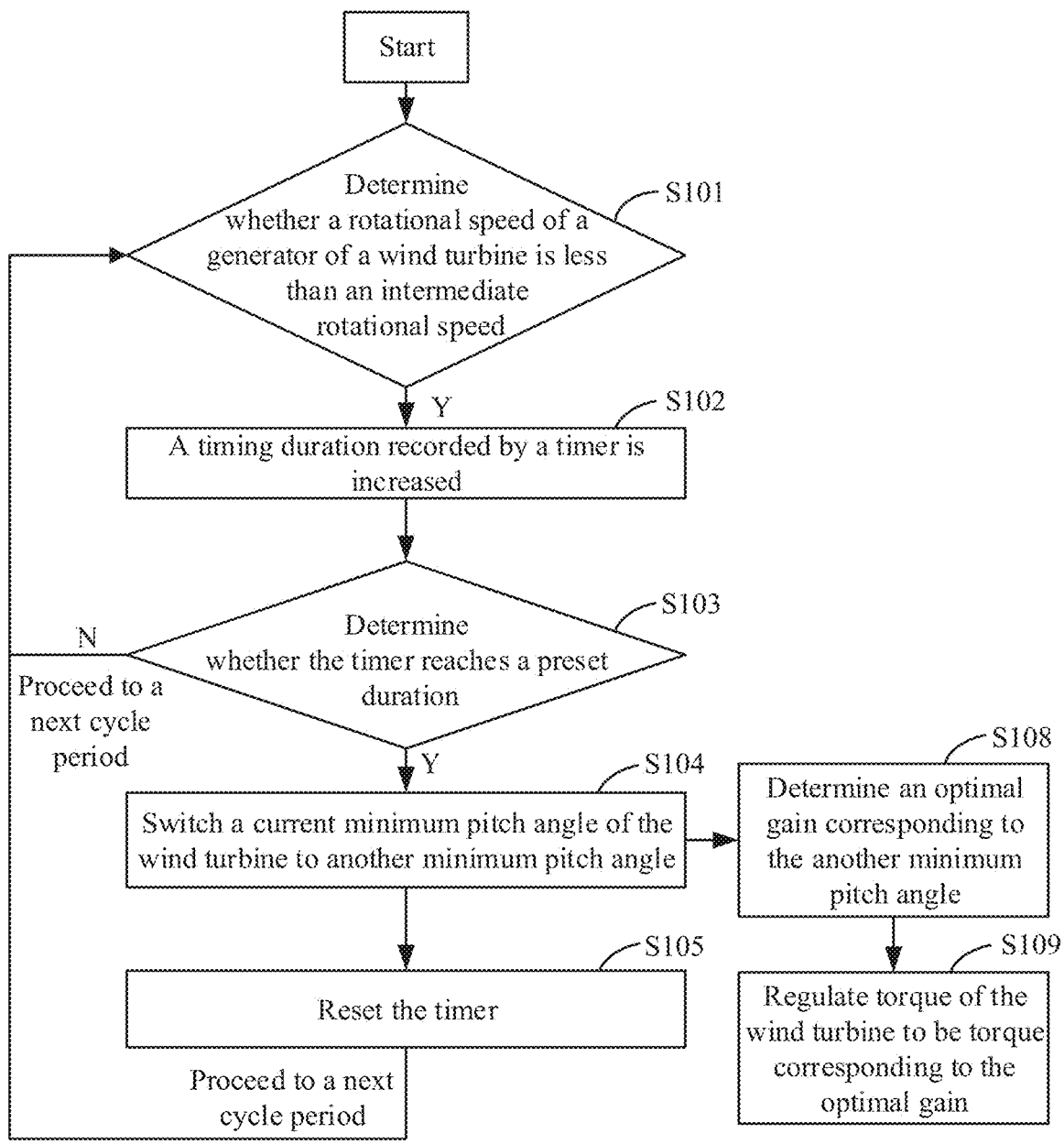
FIG. 4 is a flow chart of a pitch control method for a wind turbine according to a fourth embodiment of the present disclosure.

Reference is made to FIG. 4, which shows a flow of a method for controlling a pitch drive mechanism of a wind turbine according to a fourth embodiment. The method according to the embodiment further includes steps S108 and S109 based on the embodiment shown in FIG. 1. For descriptions of steps S101 to S105, reference can be made to the first embodiment, which is not described hereinafter. Only steps S108 and S109 are described.

In step S108, an optimal gain corresponding to the another minimum pitch angle is determined.

It can be appreciated that, there is a curve diagram corresponding to the minimum pitch angles. The curve diagram represents a relation between power coefficient and tip speed ratio of the generator at a minimum pitch angle.

Figure 5:
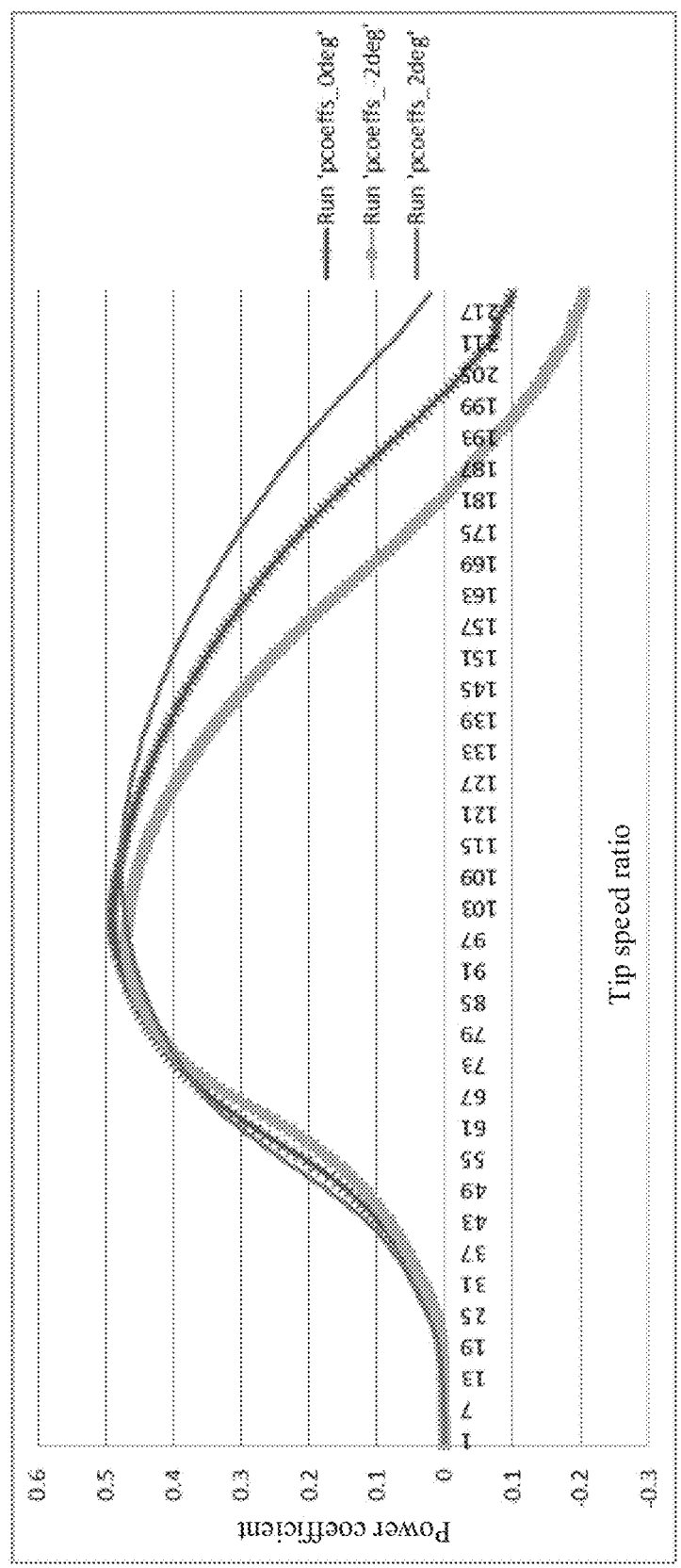
FIG. 5 is a curve diagram of a relation between tip speed ratios and power coefficients at three different minimum pitch angles according to the present disclosure.

For example, reference is made to FIG. 5, which shows relation curves of tip speed ratios and power coefficients at three different minimum pitch angles. A first curve shows a relation between a tip speed ratio and a power coefficient in a case that the minimum pitch angle is 2 deg. A second curve shows a relation between a tip speed ratio and a power coefficient in a case that the minimum pitch angle is 0 deg. A third curve shows a relation between a tip speed ratio and a power coefficient in a case that the minimum pitch angle is −2 deg.

It can be seen that, different minimum pitch angles correspond to different curves between tip speed ratios and power coefficients.

After the current minimum pitch angle is switched to the another minimum pitch angle in step S104, the optimal gain may be determined based on the curve diagram of the another minimum pitch angle.

The curve diagram of the another minimum pitch angle is searched for a highest power coefficient. The highest power coefficient is a power coefficient corresponding to a highest point in the curve diagram. Further, the curve diagram is searched for a tip speed ratio corresponding to the highest power coefficient.

The optimal gain is obtained with the power coefficient and the tip speed ratio according to a gain calculation formula.

The gain calculation formula may be $K_{opt}=\frac{1}{2} \cdot \rho \cdot C_{Pmax} \cdot \pi \cdot R^5 / \lambda_{opt}^3$, where $\rho$ indicates an air density, Cpmax indicates the highest power coefficient, R indicates a turbine radius of the wind turbine, and λopt indicates the tip speed ratio corresponding to the highest power coefficient.

In step S109, torque of the wind turbine is regulated to be torque corresponding to the optimal gain.

The torque can be expressed by the formula $T=1/2 \rho\pi\omega^2 R^5 C_p/\lambda^3$, which can be derived from the following equations:

$P=\frac{1}{2}mV^2C_p$, (1)
$m=\rho\pi R^2 V$, (2)
$P=T\omega$, (3)
$\lambda=\omega R/v$, (4), where P is power of the wind turbine, m is mass of air swept by a blade of the wind turbine in unit time, $C_p$ is a power coefficient, V is a wind speed, T is the torque, ω is a rotational speed of the generator, and λ is a tip speed ratio. Therefore, the torque corresponding to the optimal gain can be expressed by $T=\frac{1}{2}\rho\pi\omega^2 R^5 C_{p\ max}/\lambda_{opt}^3$, and the correspondence between the torque and the optimal gain may be obtained with the formula $T=K_{opt}\omega^2$, where $K_{opt}$ indicates the optimal gain. As can be seen, the torque corresponding to the optimal gain can be calculated with the formula. Maximum wind energy can be captured by regulating torque of a converter in the wind turbine to the calculated torque.

In the above technical solutions, different minimum pitch angles may be set, and optimal gains may be determined based on the minimum pitch angles, to achieve capture of maximum wind energy.

The pitch control method for the wind turbine is provided according to the above embodiments. A pitch control device for a wind turbine is further provided according to embodiments of the present disclosure. The pitch control device for the wind turbine according to the embodiments of the present disclosure is described hereinafter.

Figure 6:
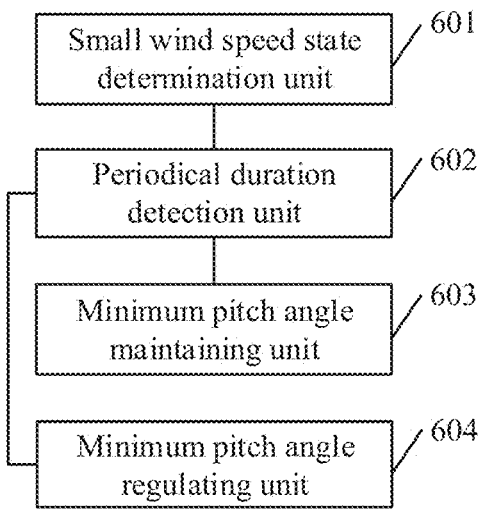
FIG. 6 is a schematic structural diagram of a pitch control device for a wind turbine according to a first embodiment of the present disclosure.

Reference is made to FIG. 6, which shows a schematic structural diagram of a pitch control device for a wind turbine according to a first embodiment.

The control device according to the embodiment may include: a small wind speed state determination unit 601, a periodical duration detection unit 602, a minimum pitch angle maintaining unit 603, and a minimum pitch angle regulating unit 604.

The small wind speed state determination unit 601 is configured to periodically determine whether a current wind speed is a preset small wind speed according to a second preset duration.

The periodical duration detection unit 602 is configured to detect, each time it is determined that the current wind speed is the preset small wind speed, whether a maintaining duration of a current minimum pitch angle of the wind turbine reaches a first preset duration.

The minimum pitch angle maintaining unit 603 is configured to maintain, in a case that the maintaining duration does not reach the first preset duration, the current minimum pitch angle.

The minimum pitch angle regulating unit 604 is configured to regulate, in a case that the maintaining duration reaches the preset duration, the current minimum pitch angle to be another minimum pitch angle.

The periodical duration detection unit may include a periodical duration detection subunit.

The periodical duration detection subunit is configured to detect whether the maintaining duration of the current minimum pitch angle of the wind turbine reaches the first preset duration corresponding to the current minimum pitch angle.

The small wind speed state determination unit may include a rotational speed determination subunit.

The rotational speed determination subunit is configured to periodically determine whether the current rotational speed of the generator in the wind turbine is less than a preset rotational speed threshold. The preset rotational speed threshold is an average value of a maximum rotational speed and a minimum rotational speed of the generator of the wind turbine.

Figure 7:
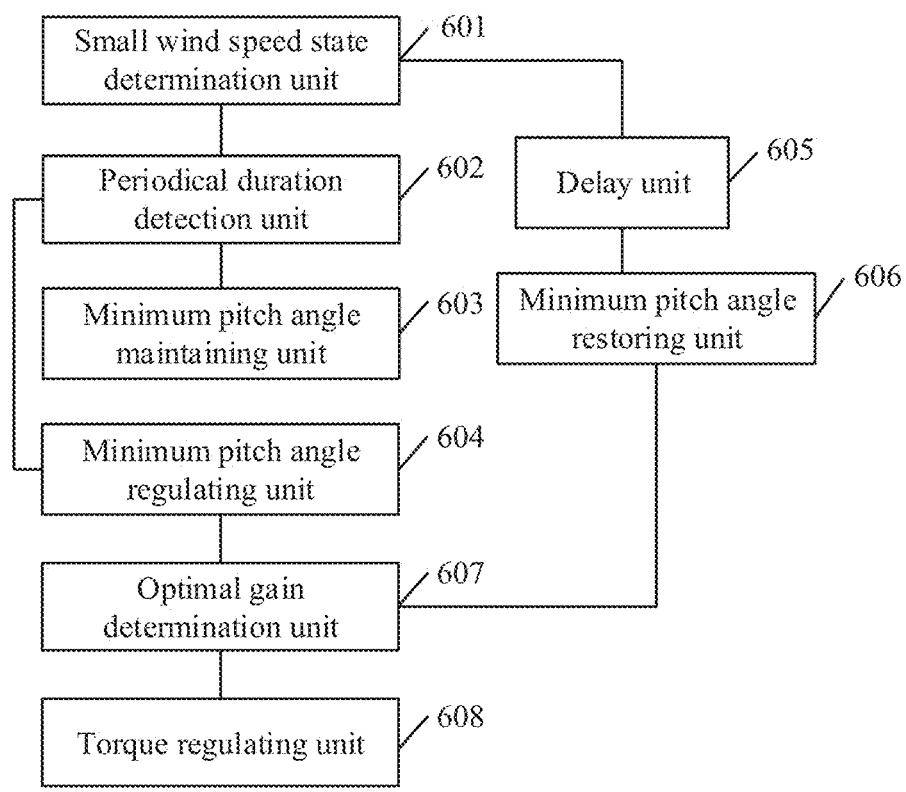
FIG. 7 is a schematic structural diagram of a pitch control device for a wind turbine according to a second embodiment of the present disclosure.

Reference is made to FIG. 7. Based on the control device according to the above first embodiment, the control device according to the embodiment may further include: a delay unit 605, a minimum pitch angle restoring unit 606, an optimal gain determination unit 607 and a torque regulating unit 608.

The delay unit 605 is configured to determine whether a maintaining duration of a state that the current wind speed is greater than or equal to the preset small wind speed reaches a third preset duration.

The minimum pitch angle restoring unit 606 is configured to switch the current minimum pitch angle to a default minimum pitch angle.

The optimal gain determination unit 607 is configured determine an optimal gain corresponding to the minimum pitch angle reached after the switching.

The torque regulating unit 608 is configured to regulate torque of the wind turbine to be torque corresponding to the optimal gain.

The optimal gain determination unit may include a power coefficient and tip speed ratio determination subunit, and an optimal gain determination subunit.

The power coefficient and tip speed ratio determination subunit is configured to search for a highest power coefficient and a tip speed ratio corresponding to the highest power coefficient, in a curve diagram corresponding to the minimum pitch angle reached after the switching. The curve diagram shows a relation between power coefficients and tip speed ratios of the generator at the minimum pitch angle reached after the switching.

The optimal gain determination subunit is configured to calculate the optimal gain corresponding to the power coefficient and the tip speed ratio based on a gain calculation formula.

Based on the pitch control method and device for the wind turbine according to the above embodiments, another pitch control device for a wind turbine is further provided according to an embodiment of the present disclosure.

The pitch control device for the wind turbine according to the embodiment includes a memory and a processor.

The memory is configured to store a program and data generated in running the program.

The processor is configured to perform any one of the above pitch control methods for the wind turbine by executing instructions in the memory.

It should be noted that, various embodiments in the specification are described in a progressive manner, differences from other embodiments are emphatically illustrated in each embodiment, and reference can be made to each other for understanding the same or similar sections.

It should also be noted that in the specification, relational terms such as the first or the second are only used to differentiate one entity or operation from another entity or operation, rather than require or indicate any actual relation or sequence between the entities or operations. Moreover, terms "include", "have" or any other variants thereof are meant to cover non-exclusive inclusion, so that the process, method, item or apparatus including a series of elements is not limited to those elements, and optionally includes other elements that are not specifically listed or that are inherent in the process, method, item or apparatus. With no other limitations, an element restricted by the phrase "include a . . . " does not exclude the existence of other identical elements in the process, method, item or apparatus including the element.

The above descriptions of the disclosed embodiments enable those skilled in the art to implement or practice the present disclosure. Various changes to the embodiments are obvious to those skilled in the art, and general principles defined herein may be implemented in other embodiments without departing from the spirit or scope of the present disclosure. Therefore, the invention is not limited to the embodiments disclosed herein, but is to conform to the widest scope consistent with the principles and the novel features disclosed herein.

The invention claimed is:

1. A pitch control method for a wind turbine, comprising:
setting a plurality of minimum pitch angles; and
switching among the plurality of minimum pitch angles at regular intervals;
wherein switching among the plurality of minimum pitch angles at regular intervals comprises:
determining whether a maintaining duration of a current minimum pitch angle reaches a respective preset duration for the current minimum pitch angle, and switching the current minimum pitch angle to another minimum pitch angle of the plurality of the minimum pitch angles in a case that the maintaining duration reaches the respective preset duration for the current minimum pitch angle.

2. The control method according to claim 1, wherein, before the switching among the plurality of minimum pitch angles at regular intervals, the method further comprises:
acquiring periodically an operating parameter of the wind turbine according to a second preset duration, and determining whether the operating parameter of the wind turbine is less than a preset threshold;
wherein the switching among the plurality of minimum pitch angles at regular intervals is performed in a case that the operating parameter of the wind turbine is less than the preset threshold.

3. The control method according to claim 2, further comprising:
switching, in a case that the operating parameter of the wind turbine is greater than or equal to the preset threshold, the current minimum pitch angle to a default minimum pitch angle after a third preset duration, wherein the default minimum pitch angle is less than a minimum value of the plurality of minimum pitch angles.

4. The control method according to claim 3, wherein the operating parameter comprises:
a wind speed, a turbulence intensity, a rotational speed or a power.

5. The control method according to claim 3, further comprising:
determining an optimal gain, wherein the optimal gain corresponds to a minimum pitch angle reached after the switching; and
regulating torque of the wind turbine to be torque corresponding to the optimal gain.

6. The control method according to claim 2, wherein the operating parameter comprises:
a wind speed, a turbulence intensity, a rotational speed or a power.

7. The control method according to claim 1, further comprising:
determining an optimal gain, wherein the optimal gain corresponds to a minimum pitch angle reached after the switching; and
regulating torque of the wind turbine to be torque corresponding to the optimal gain.

8. A pitch control device for a wind turbine, comprising:
a memory, configured to store instructions for performing the method according to claim 1; and
a processor, configured to read and execute the instructions in the memory.

9. A pitch control device for a wind turbine, comprising:
a minimum pitch angle setting module, configured to set a plurality of minimum pitch angles; and
a minimum pitch angle switching module, configured to switch among the plurality of minimum pitch angles at regular intervals;
wherein switching among the plurality of minimum pitch angles at regular intervals comprises:
determining whether a maintaining duration of a current minimum pitch angle reaches a respective preset duration for the current minimum pitch angle, and switching the current minimum pitch angle to another minimum pitch angle of the plurality of the minimum pitch angles in a case that the maintaining duration reaches the respective preset duration for the current minimum pitch angle.

10. The control device according to claim 9, further comprising:
a wind turbine operating parameter determination module, configured to acquire periodically an operating parameter of the wind turbine according to a second preset duration, and determine whether the operating parameter of the wind turbine is less than a preset threshold; wherein the minimum pitch angle switching module is triggered in a case that the operating parameter of the wind turbine is less than the preset threshold.

11. The control device according to claim 10, further comprising:
a minimum pitch angle restoring module, configured to switch, in a case that the operating parameter of the wind turbine is greater than or equal to the preset threshold, the current minimum pitch angle to a default minimum pitch angle after a third preset duration, wherein the default minimum pitch angle is less than a minimum value of the plurality of minimum pitch angles.

12. The control device according to claim 11, wherein the operating parameter acquired by the wind turbine operating parameter determination module comprises:
a wind speed, a turbulence intensity, a rotational speed or a power.

13. The control device according to claim 11, further comprising:
an optimal gain determination module, configured to determine an optimal gain, wherein the optimal gain corresponds to a minimum pitch angle reached after the switching; and
a torque regulating module, configured to regulate torque of the wind turbine to be torque corresponding to the optimal gain.

14. The control device according to claim 10, wherein the operating parameter acquired by the wind turbine operating parameter determination module comprises:
a wind speed, a turbulence intensity, a rotational speed or a power.

15. The control device according to claim 9, further comprising:
an optimal gain determination module, configured to determine an optimal gain, wherein the optimal gain corresponds to a minimum pitch angle reached after the switching; and
a torque regulating module, configured to regulate torque of the wind turbine to be torque corresponding to the optimal gain.

* * * * *